(12) United States Patent
Niklewicz et al.

(10) Patent No.: US 8,517,650 B2
(45) Date of Patent: Aug. 27, 2013

(54) REMOVABLE BLIND FASTENER

(75) Inventors: Jan Niklewicz, London (GB); Dean Ainsley Carran, Kingston Upon Thames (GB)

(73) Assignee: Kwikbolt Limited, Kingston Upon Thames (GB)

( * ) Notice: Subject to any disclaimer, the term of this patent is extended or adjusted under 35 U.S.C. 154(b) by 245 days.

(21) Appl. No.: 12/865,111

(22) PCT Filed: Jan. 13, 2009

(86) PCT No.: PCT/GB2009/000119
§ 371 (c)(1),
(2), (4) Date: Sep. 14, 2010

(87) PCT Pub. No.: WO2009/095640
PCT Pub. Date: Aug. 6, 2009

(65) Prior Publication Data
US 2011/0008124 A1    Jan. 13, 2011

(30) Foreign Application Priority Data
Feb. 1, 2008    (GB) .................................. 0801856.6

(51) Int. Cl.
*F16B 13/06*    (2006.01)
(52) U.S. Cl.
USPC ........................................ 411/57.1; 411/271
(58) Field of Classification Search
USPC ................. 411/57.1, 21, 32, 46, 54, 54.1, 55, 411/76, 80, 80.2
See application file for complete search history.

(56) References Cited

U.S. PATENT DOCUMENTS

| 2,379,786 | A | | 7/1945 | Bugg et al. | |
| 4,934,885 | A | | 6/1990 | Woods et al. | |
| 5,106,225 | A | * | 4/1992 | Andre et al. | ............... 403/408.1 |
| 5,599,148 | A | * | 2/1997 | Hirose | ........................... 411/175 |
| 6,048,147 | A | * | 4/2000 | Arisaka et al. | ................... 411/48 |
| 2005/0169726 | A1 | * | 8/2005 | McClure | ......................... 411/55 |

FOREIGN PATENT DOCUMENTS

| DE | 3107153 A1 | 9/1982 |
| GB | 624714 A | 6/1949 |
| WO | 03/069971 A | 8/2003 |

OTHER PUBLICATIONS

International Search Report for International Appl. No. PCT/GB2009/000119, European Patent Office, Jun. 5, 2009.

* cited by examiner

*Primary Examiner* — Gary Estremsky
(74) *Attorney, Agent, or Firm* — Nevrivy Patent Law Group P.L.L.C.

(57) ABSTRACT

A removable blind fastener comprising a first member (10) having an elongate body (11) with a head (12) at one end, a second member (20) adapted for axial movement relative to the first member, the second member having a threaded aperture (25) and at least one adjustable finger (22), the adjustable finger having a flange remote from the head of the first member and the finger being within the circumference of the hollow body of the first member in the first position of the adjustable finger and the flange extends beyond the circumference of the hollow body of the first member in the second position of the adjustable finger. Rotation of a threaded member (30) in a first direction causes axial movement of the second member relative to the first member in a clamping direction.

24 Claims, 6 Drawing Sheets

REMOVABLE BLIND FASTENER

BACKGROUND

1. Technical Field of the Invention

The present invention relates to fasteners for temporarily clamping two or more components prior to permanent fixing.

It is sometimes desirable to remove a fastener. For example it may be desirable to secure temporarily a sheet of material in place over a frame to align it before making a permanent fastening of the sheet of material to a frame, e.g. when applying a skin to an aircraft wing frame.

The discussion below relates to the assembly of aircraft structures because the accurate alignment of components prior to permanently fixing with a large number of fastening means is particularly important. However, the invention may be used in any application where two or more components are to be joined together.

Aircraft structures, such as wing sections and fuselages, are assembled by fixing sheet materials to rigid members such as spars, ribs, runners, stringers etc. In order to fix, for example, a wing-skin panel to a number of ribs, the wing-skin panel is placed over the ribs, aligned and clamped securely in place. A series of holes are drilled through the materials, and permanent fastenings such as rivets are placed and secured. For small structures clamping of the component materials can be along the edge of the materials. For large structures however it is not possible to achieve accurate alignment with this technique. For the assembly of large structures a series of clamping holes are drilled at selected points across the structure. Temporary fasteners are then inserted into these holes to secure the component materials while further holes are drilled to receive permanent rivet fasteners. When rivets have been placed and secured the temporary fasteners are removed and subsequently replaced with permanent rivet fastening. The number and location of the temporary fastenings will vary between applications, but for a typical wing set, i.e. two complete wings, for a large commercial passenger aircraft, the number of temporary fastenings used can reach around 25,000. It is convenient for such temporary fasteners to be operated from one side of the work-piece only, i.e. to be able to insert and activate the fastener from above the work-piece without having to perform an operation on the underside of the work-piece, for instance screwing or tightening. Not only does one-sided operation simplify the assembly process, but it is often the case that the underside of a work-piece is not accessible at all. Fasteners that are operable from a single side of the work-piece are termed "blind" fasteners.

2. Description of Related Art

Figure 1:
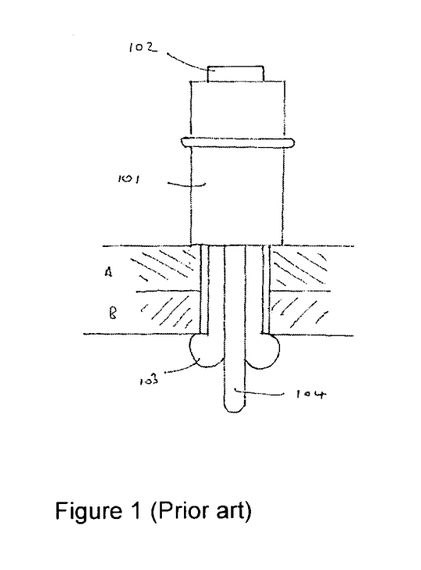
FIG. 1 shows a cross section view of a temporary fastener of the prior art.

Conventionally, spring-loaded temporary fasteners are used, of the type shown in FIG. 1. The fastener has a body 101, a cap 102 and jaws 103. The jaws 103 of the fastener are biased towards, and rest against, a locating strip 104. The jaws 103 are extended by depressing the cap 102 against the action of an internal spring (not shown). Extension of the jaws 103 causes them to travel along the locating strip 104. As the jaws 103 reach the end of the strip and their width becomes narrowed. The jaws 103 may then pass through a hole between work-pieces A and B. As the pressure on the cap 102 is removed the jaws 103 retract and expand as they travel back along the locating strip 104 towards the body 101. As they expand the jaws grip the outer surface of work-piece B and pull it towards work-piece A.

As can be seen from FIG. 1, the bulk of the fastener is above the top surface of the work-piece and is therefore exposed and vulnerable and presents an obstruction on the surface of the work-piece. This is a particular problem in automated assembly processes; tool heads sweep rapidly across the surface of the materials and protruding fasteners will impede the movement of these automated tools. Another problem with the prior art shown in FIG. 1 is that the maximum clamping pressure is determined by the strength of the internal spring.

SUMMARY OF THE INVENTION

The present invention therefore provides a removable blind fastener comprising a first member having an elongate body with a head at one end, a second member adapted for axial movement relative to the first member, the second member having a threaded aperture and at least one adjustable finger, the adjustable finger having a flange remote from the head of the first member and the finger being adjustable between first and second positions in which the flange is at or within the circumference of the hollow body of the first member in the first position of the adjustable finger and the flange extends beyond the circumference of the hollow body of the first member in the second position of the adjustable finger; and a threaded member having a shaped head for engagement with the head of the first member and a threaded shaft with a finger engagement surface remote from the shaped head, whereby, when in use, the threaded member is adapted to extend into the hollow body of the first member and to engage with the threaded aperture of the second member and the finger engagement surface of the threaded shaft is arranged to engage with the adjustable finger of the second member such that rotation of the threaded member in a first direction causes axial movement of the second member relative to the first member in a clamping direction and movement of the adjustable finger in the direction of its second position whereas rotation of the threaded member in a second direction causes axial movement of the second member relative to the first member in a releasing direction and movement of the adjustable finger in the direction of its first position.

Preferably the first and second members are telescopic. Preferably the second member slides within the first member. Preferably the inside surface of the first member is a non-circular shape and the outside of the second member is a co-operating non circular shape to prevent rotation of the second member inside the first member.

Preferably at least two fingers, such as three or four fingers are provided. Preferably each finger head provides a planar surface to engage with a planar surface of a work-piece face, and the planar surface is blemish-free to prevent damage to a work-piece.

Preferably the heads on the flexible fingers in combination form a cone shape prior to being biased radially outwards.

Preferably the first and second members form a cylindrical body and the heads on the flexible fingers are biased to a position within the circumference of the cylindrical body before being biased outwards by the screw.

Preferably the fingers are biased outwards by the end of the screw shaft remote from the screw head moving between the fingers. The finger engagement surface of the screw shaft may be tapered and/or smooth.

Preferably the screw head is housed in a recess in the first member head.

Preferably the screw head is adapted to receive a tool to turn it. The head may include a hex recess to receive a hex tool.

Preferably the first member head is adapted to receive a tool to prevent it from rotating whilst said screw head is rotated. The first member head may include slots to receive a tool.

The outer surface of the first member may be polished. The first member may be a dowel to align the work-pieces and may have a chamfered outer edge to assist with insertion of the fastener into a hole. The first member has a countersunk head so that it may form a flush fit with a surface of the work-pieces.

Preferably the screw member has a countersunk head and the first member has a recess to receive the countersunk head of the screw member, so that the screw member head is a flush fit with the first member. The fastener is preferably operable from one side only of work-pieces to be joined and is therefore a blind fastener.

In another embodiment of the invention a removable blind fastener is provided comprising a first member having an elongate body with a head at one end, a second member having an elongate body extending from and adapted to slide relative to the first member, said second member having at least one flexible finger with a finger head at one end remote from the first member, a screw member having a screw head adjacent the first member head and a screw shaft which passes through the first member and engages with a threaded aperture on the second member, rotation of the screw member in one direction sliding the second member towards the first member and biasing the or each flexible finger radially outward and rotation of the screw member in the other direction sliding the second member away from the first member and allowing the or each flexible finger to move radially inwards, such that in use the fastener is insertable through an aperture in work-pieces to be joined, with the head of the first member located against a face of one work-piece, and rotation of said screw causing the or each flexible finger to expand radially outward so the finger head on the or each finger engages a face of another work-piece and causing the work-pieces to be drawn together as said second member slides towards the first member.

The foregoing and other objects, aspects and advantages will be better understood from the following detailed description of a preferred embodiment of the present invention with reference to the drawings, in which:

Figure 2:
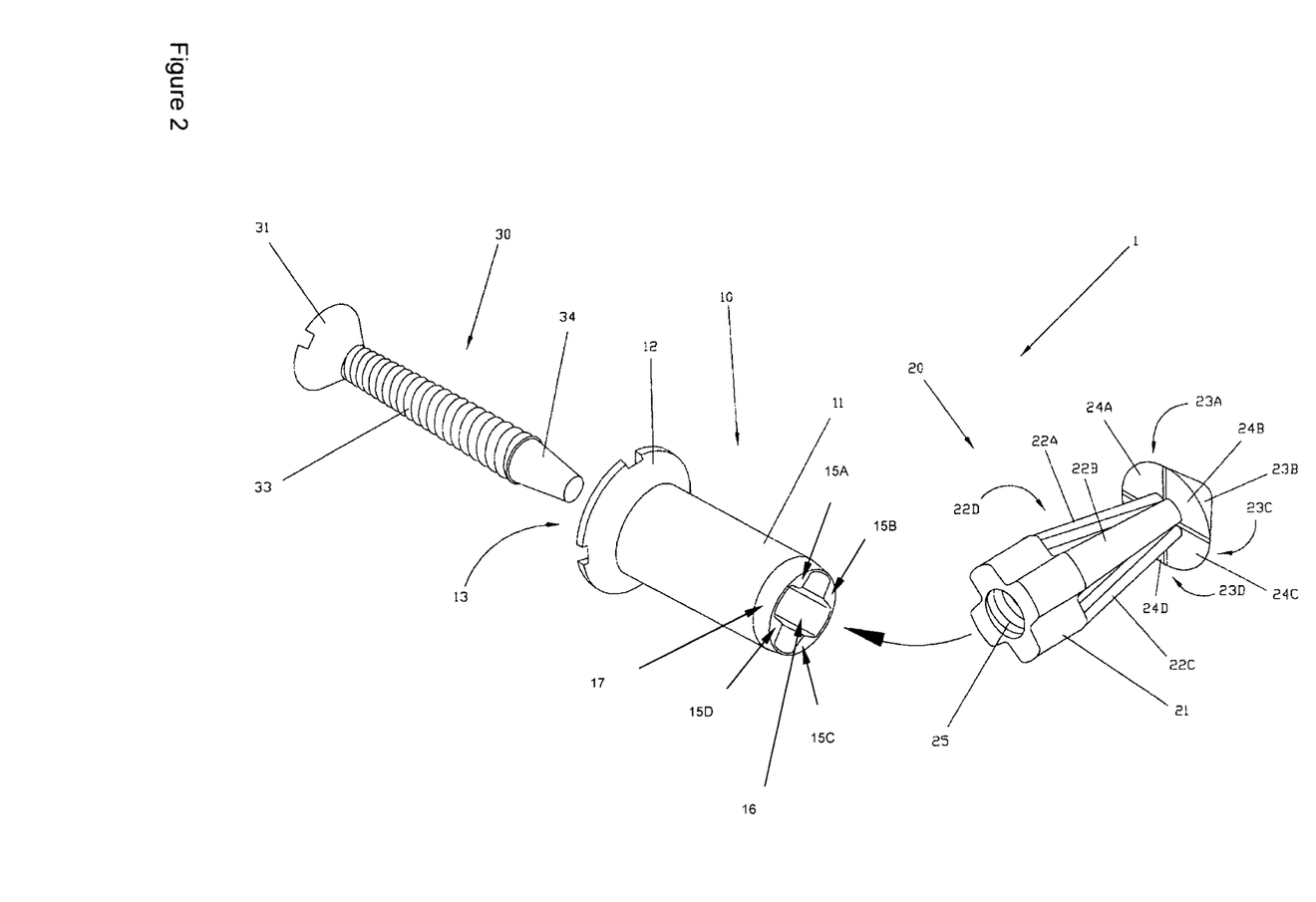
FIG. 2 shows an exploded perspective view of a removable blind fastener in accordance with the present invention.

FIG. 2 shows the components of the removable blind fastener of the present invention. A first member 10 is provided having an elongate cylindrical hollow body 11 with a countersink head 12 at one end of body 11. The first member 10 is fabricated by direct laser metal sintering (DLMS), which is a rapid prototyping technique, whereby a CAD file representing the first member 10 is used to control a laser which fuses metal powder into a solid body. The metal is maraging steel. The outer surface of the first member 10 is polished using an ultrasound polishing technique in order to remove any imperfections which may damage the work-piece to be clamped by the fastener 1. In aerospace applications the structure around a hole is particularly sensitive to damage; cyclic loading of parts can cause small defects to spread rapidly and cause catastrophic failure of the component. The outer diameter of the first member 10 is determined by the diameter of the hole in the work-piece into which it is to be inserted. Therefore a range of fasteners are provided to fit a range of holes sizes. In this example the fastener is intended to fit a ¼" (0.635 cm) hole. The first member 10 acts as a dowel to peg two work-pieces together and hence to ensure alignment of the work-pieces, and as such the outer diameter of the first member 10 should be equal to, or slightly less than, the diameter of the hole, for a snug fit. The wall of the first member 10 must be strong but also thin to allow full flexing of fingers associated with a second member, as discussed below. The first member 10 is provided with a chamfer 17, set at an angle of 9°, which assists in locating the fastener within a hole drilled in the work-piece. Head 12 has a countersink recess 13 for receiving a screw member 31. Four slots 14 are provided in the head 12 which are used to hold the first member 10 stationary in relation to other components of the fastener during use, as discussed below. The inside of hollow body 11 is generally "cross-shaped", in that a cross-shaped recess 16 is provided running in an axial direction, to provide four triangular-section protrusions 15A, 15B, 15C, 15D on the inside of the hollow body 11 as locating means.

A second member 20 is provided for cooperation with the first member 10. The second member comprises a body 21 and four flexible fingers 22A, 22B, 22C, 22D. The body 21 and the fingers 22A-D are formed as a single unit to avoid the weakness that would arise if these elements were formed separately and then joined. The body 21 is formed as a "cross-shape" which corresponds to the cross-shaped recess of the first member 10, and provides four protrusions 21A, 21B, 21C, 21D to locate with the triangular-section protrusions 15A-D on the inside of the hollow body 21 of the first member 10. The cross-shapes of the telescoping bodies prevent rotation of one body relative to the other. The body 21 is provided with a threaded hole 25 in an axial direction suitable for receiving the threaded shank of a screw member 30. The four flexible fingers 22A-D are each located at an outer edge of protrusion 21A-D and extend from body 21 away from the threaded hole 25.

Figure 4A:
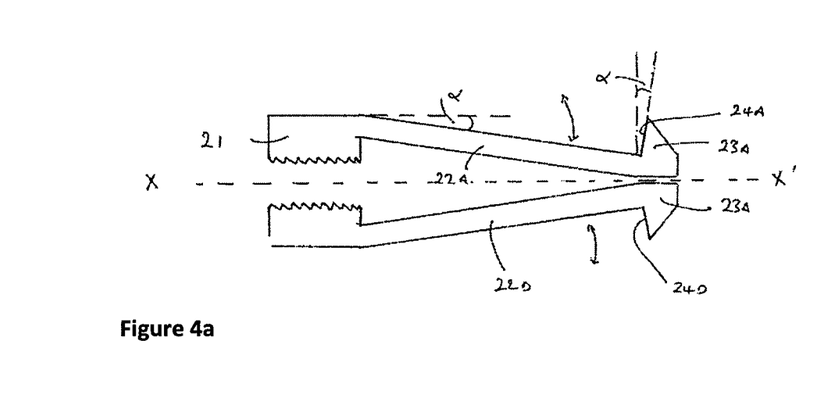
FIG. 4a shows a cross section view of a second member of the removable blind fastener shown in FIG. 2 at rest in an un-biased position.
Figure 4B:
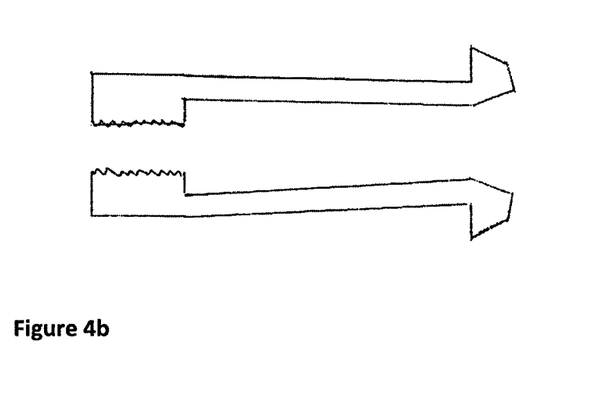
FIG. 4b shows a cross section view of a second member of the removable blind fastener shown in FIG. 2 in an activated, biased, position.

FIGS. 4a and 4b show in detail the arrangement of fingers 22A and 22C in relation to the body 21. At rest each finger is disposed to converge at a point remote from the body 21, subtending an angle α between the finger and a central axis X-X'. At rest, α=15°. When pressure is applied to the internal face of a finger, the finger flexes and moves outwards away from the central axis A, and the angle α tends towards zero. When pressure is removed from the internal face of the finger, the finger will return to its rest position.

Each finger 22A-D has a head 23A, 23B, 23C, 23D at one end remote from the first member 10. A cone shape is formed by the four heads 23A-D to pass through an aperture easily. The cone shape has a diameter less than the diameter of the cylindrical body 11, i.e. radially within the extremities of the body 11. FIG. 4a shows in detail heads 23A and 23C associated with fingers 22A and 22C. The head 23A has a planar surfaces 24A orientated perpendicularly to the finger 22A. When at rest, the planar surface 24A subtends the same angle α to a direction perpendicular to the central axis X-X' as the finger 22A subtends to the central axis X-X'. Therefore, when the finger 22A is in a flexed position under the action of a force applied to an internal face (i.e. angle α tends to zero), the planar surface 24A is co-planar with the surface of a work-piece. Planar surfaces 24A are clamping surfaces of the fastener and the clamping forces are exerted between these surfaces and the head 12 of the first member 10. Planar surfaces 24A-D should be substantially blemish-free so that they do not impart any marking or scoring to the work-piece that they are clamped against.

The second member 20 is fabricated using the DLMS technique. Localised regions of the second member 20 endure high stresses in use and a suitable material for this component should be employed. In this instance maraging steel is used which is selected for its high yield strength. Areas of the second member 20 that are stressed during use include the region between the body 21 and fingers 22A-D; this region acts as a spring, or resilient region, which restores the fingers 22A-D to their rest position when pressure is removed from the internal face of the fingers. Another stressed region of the second member 20 is that between the fingers 22A-D and the heads 23A-D; the clamping force acts through this region. It is preferable that the second member 20 is formed as a single unit. It may be possible to fabricate the second member 20 as a series of bonded components, but bonded joints in the regions that are subject to high stress would be prone to failure. Thus, the complex shape of the second member 20 is particularly suited to fabrication using DLMS, where the component is made as a single piece.

A screw member 30 is provided having a countersunk screw head 31. Head 31 has a hexagonal shaped recess 32 so it can be rotated by a hex tool. Screw member 30 has a screw shaft 33 which passes through the first member body 11 and engages with the threaded aperture 25 on the second member body 21. The end 34 of screw shaft 33 is tapered and smooth. The screw is made from 12.9 grade high tensile steel.

Figure 3:
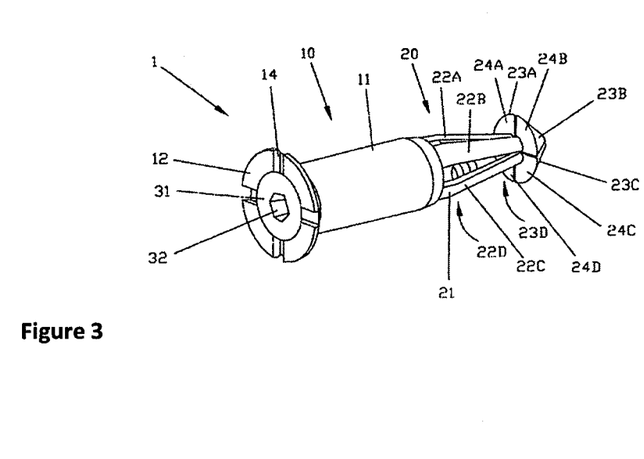
FIG. 3 shows an assembled perspective view of the removable blind fastener of FIG. 2.

FIG. 3 shows a removable blind fastener in an assembled state. In order to assemble the fastener, the cross-shaped body 21 of the second member 20 is inserted into the cross-shaped recess of the first member 10, and the screw member 30 inserted through the head 12 of the first member 10. The screw member 30 passes through the first member 10 to engage with the threaded aperture 25 of the second member 20 and the screw turned until the tapered end 34 of the screw member 30 rests against the internal surfaces of the fingers 22A-D.

Figure 5A:
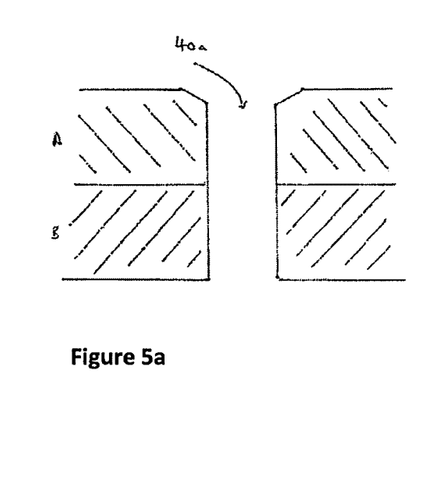
FIG. 5a shows a cross section view of two work-pieces drilled ready to receive the removable blind fastener shown in FIG. 2.

The operation of the fastener is described below with reference to FIGS. 5a to 5e. Firstly work-piece A is aligned with work-piece B. Work-pieces may be wing-skins, spars, struts, ribs, runners or stingers, or any combination, not limited to two pieces and may be a stack of three or more pieces. The fastener 1 may also pass through the flanges of an I-beam. A hole 40a is then drilled between the two work-pieces which may then be reamed to the correct tolerance. The hole is then countersunk to leave an aperture 40a as shown in FIG. 5a.

Figure 5B:
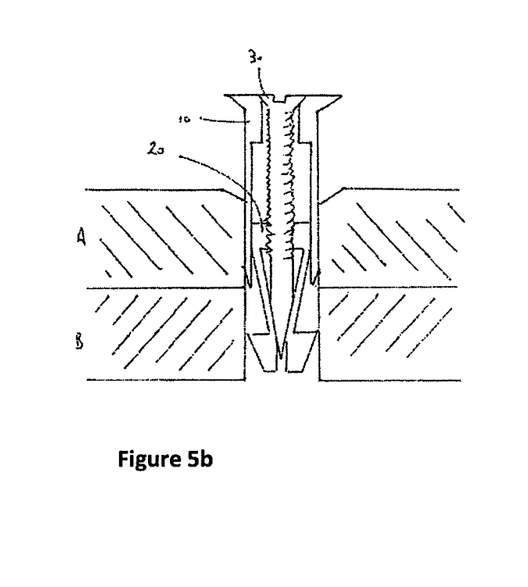
FIG. 5b shows a cross section view of a removable blind fastener being inserted into the drilled hole of FIG. 4A.
Figure 5C:
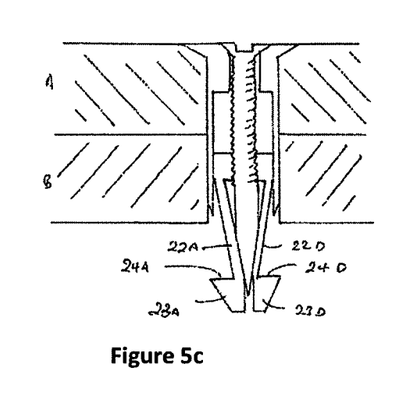
FIG. 5c shows a cross section view of a removable blind fastener fully inserted into the drilled hole of FIG. 4A before tightening.

FIG. 5b shows a fastener 1 being inserted into the hole 40a, where it can be seen that the heads 23A-D of the second member 30 are narrow enough to pass through hole 40a. FIG. 5c shows the fastener 1 fully inserted into hole 40a to join the two work-pieces together. The head 12 of body 11 engages in the countersink of aperture 40a to engage the face of work-piece A. It can be seen that the fastener 1 is a flush fit against the surface of work-piece A and therefore causes no obstruction on the work-piece surface. Therefore the surface of clamped work-pieces, such as a wing section under construction is flat to the same extent as the finished wing section with permanent rivets in place. This allows machinery to move across the surface of the work-pieces unimpeded by temporary clamping fasteners.

The outer surface of first member 10 is a snug fit into the hole 40a and dowels the two work-pieces together to maintain their alignment. It will be seen that the length of the first member 10 should be sufficient to provide an adequate dowelling action between work-piece A and work-piece B and therefore the length of the first member 10 will be determined by the combined thickness of the work-pieces to be joined. Fastener 1 is therefore tailored to suit particular applications. Generally the thickness of the work-pieces will also determine the diameter of the hole 40a and possibly also the spacing of fasteners across the structure being assembled.

Figure 5D:
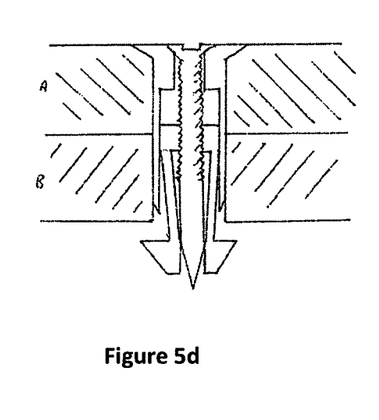
FIG. 5d shows a cross section view of a removable blind fastener fully inserted into the drilled hole of FIG. 4A which has been partially tightened.

When the fastener 1 is comfortably in hole 40a the screw member 30 is rotated. Rotation of the screw 30 in one direction slides the second member 20 towards the first member 10. As the second member 20 slides towards the first member 30, the smooth tapered end 34 of screw shaft 33 pushes against the flexible fingers 22A-D biasing them radially outwards so that the planar portions 24A-D engage with the face of workpiece B. FIG. 5d shows the fingers 22A-D having moved outwards to their fullest extent. This extent is determined by the diameter of the screw shaft 33, in that fingers 22A-D travel along the smooth tapered end of the screw shaft 33 opening out as they do so, until they reach the parallel-sided part of screw shaft 33, upon which further travel along the parallel sides of the screw shaft 33 will no longer cause the fingers 22A-D to open outwards. The fingers 22A-D should move outwards to their fullest extent before the heads 23A-D engage with the outer face of work-piece B. If this were not to happen then there is a risk that the lateral movement of the heads 23A-D against the surface of the work-piece will cause damage to the surface. The fingers 22A-D do not exert any lateral pressure against the side of the hole 40a as they expand, as they are limited from doing do by the body 11 of first member 10. Therefore all of the clamping force exerted by the fastener 1 is in a direction co-axial with the fastener 1, i.e. the forces act to compress the fastener 1 and not to expand the hole 40a.

Figure 5E:
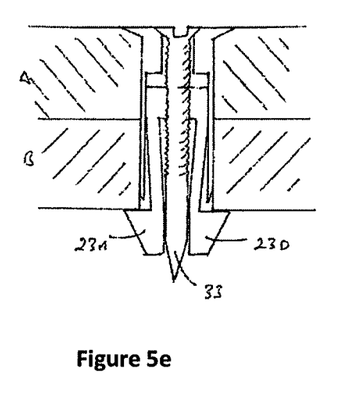
FIG. 5e shows a cross section view of a removable blind fastener fully inserted into the drilled hole of FIG. 4A which has been fully tightened.

FIG. 5e shows how further rotation of the screw 30 slides the second member further towards first member 10 so drawing the two work-pieces together so that the planar portions 24A-D fully engage with the face of the work-piece B. Clamping loads can be carefully controlled by applying an appropriate torque to the screw member 33 and can range from lightly clamped (i.e. substantially zero load but in contact with the face of the work-piece B) to loads in excess of 2000 Nm.

Rotation of the screw member 30 in the other direction slides the second member 20 away from the first member and allows the flexible fingers 22A-D to move radially inwards again back into the position shown in FIG. 5c. Movement of the fingers 22A-D radially inwards is caused by the resiliency of the material from which they are made. They are biased to return to a closed resting position. Therefore the fingers 22A-D follow the profile of the screw member 33 and as the screw member 33 withdraws relative to the second member 20 the fingers close around the smooth tip. When the fingers are fully closed, fastener 1 can be withdrawn from the aperture 40a in work-pieces A and B.

It will be appreciated that the fastener can be installed and tightened from one side of work-pieces A and B. This is termed "blind" operation; access to the underside of work-pieces A and B is not required in order to tighten or release the fastener 1.

The first member 10 may be fabricated from any suitable material such as plastic or metals such as brass, tool steel or stainless steel. The relatively simple construction of this component renders it suitable for fabrication by injection moulding or casting. The outer surface of the first member 10 may be machined to a smooth finish.

Figure 6A:
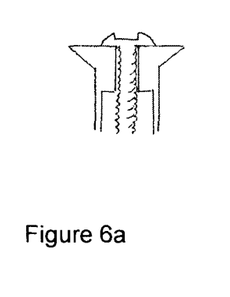
FIG. 6a shows a cross section view of a counter sunk head of a first member of the removable blind fastener with a cap head screw member.

The head 31 of screw member 33 may be of a cap head type as shown in FIG. 6a. This allows a larger hex socket to be used and thus a greater torque applied to the screw member 33. The fastener 1 would then project from the surface of the work-piece. Other shaped recesses may be provided in the head 31 for driving the screw member 30, such as "Phillips" type or slotted type heads.

Figure 6B:
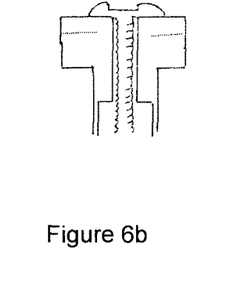
FIG. 6b shows a cross section view of a standard bolt head of a first member of the removable blind fastener with a cap head screw member.

The head 12 of the first member 10 may be of a conventional bolt type, as shown in FIG. 6b. This provides a greater purchase area for retaining first member 10 as the screw member 33 is rotated. FIG. 6b shows the use of a cap headed screw member 33 and bolt type headed first member 10, the combination of which provide a large degree of control over the two elements during insertion, tightening and removal of the fastener 1, but present a raised profile above the surface of the work-pieces.

Figure 7A:
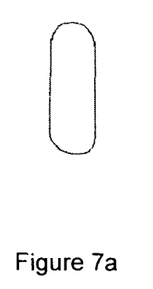
FIGS. 7a, 7b, 7c and 7d show alternative configurations of recess that may be provided in the fastener body.
Figure 7B:
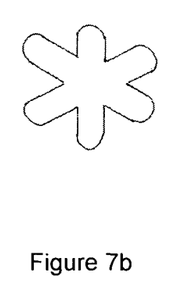
Figure 7C:
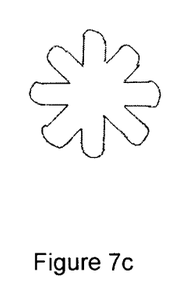
Figure 7D:
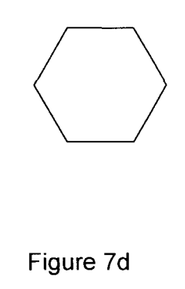

The internal recess 16 of the first member 10 may have a cross section other than cross-shaped. FIG. 7a shows a slot-like recess, FIG. 7b shows a recess having six triangular protrusions, FIG. 7c shows a recess having eight triangular protrusions, FIG. 7d shows a recess with hexagonal sides. Other configurations may be envisaged. The body 21 of the second member 22 should be shaped so as to fit within the recess 16 provided in the first member 10.

Figure 8A:
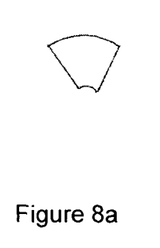
FIGS. 8a, 8b and 8c show alternative configurations of finger heads.
Figure 8B:
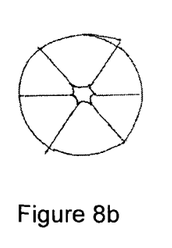
Figure 8C:
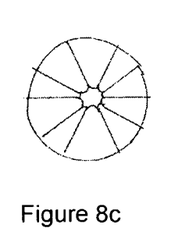

The configuration of fingers 22A-D need not be limited to four in number. For instance a single finger, as shown in plan view in FIG. 8a, would be adequate to provide a clamping force between work-pieces. Alternatively six (FIG. 8b), ten (FIG. 8c) or any other number of fingers could also be used to deliver the clamping force.

The cone-shaped head of the second member 33 could be cylindrical, as long as it was of a size to fit into the hole 40a in the work-pieces.

A series of fasteners are envisaged to fit various sized holes. For instance ¼" (0.635 cm), 5/16" (0.794 cm), ⅜" (0.953 cm), 7/16" (1.111 cm), ½" (1.270 cm), 9/16" (1.429 cm), ⅝" (1.588 cm), ¾" (1.905 cm) etc. Also metric sizes can be provided, e.g. M4, M5 etc. Each sized fastener may be colour coded for ease of identification.

Instead of the first and second member telescoping, the first and second member could have two surface such as flat surfaces which lie against each other allowing one to slide against the other, e.g. the first and second member could be abutting two half cylinders.

Further modifications will be apparent to those skilled in the art without departing from the scope of the present invention.

The invention claimed is:

1. A removable blind fastener comprising: a first member having an elongate body with a head at one end, a second member adapted for axial movement relative to the first member, the second member having a threaded aperture and at least one adjustable finger, the adjustable finger having a flange remote from the head of the first member and the finger being adjustable between first and second positions in which the flange is at or within the circumference of the hollow body of the first member in the first position of the adjustable finger and the flange extends beyond the circumference of the hollow body of the first member in the second position of the adjustable finger; and a threaded member having a shaped head for engagement with the head of the first member and a threaded shaft which passes through a restriction in the head end of the first member, wherein the restriction prevents removal of the second member from the head end of the first member, and wherein the threaded shaft engages with the threaded aperture on the second member, said threaded shaft having a finger engagement surface remote from the shaped head, whereby, when in use, the threaded member is adapted to extend into the hollow body of the first member and to engage with the threaded aperture of the second member and the finger engagement surface of the threaded shaft is arranged to engage with the adjustable finger of the second member such that the fastener comprising a unit of the first member, second member and threaded member is insertable and removable through an aperture in each of two work-pieces which need joining together with the head of the first member located against a face of one workpiece, and rotation of the threaded member in a first direction causes axial movement of the second member relative to the first member in a clamping direction causing the workpieces to be drawn together, and movement of the adjustable finger in the direction of its second position whereas rotation of the threaded member in a second direction causes axial movement of the second member relative to the first member in a releasing direction and movement of the adjustable finger in the direction of its first position.

2. The removable blind fastener of claim 1, wherein the first and second members are telescopic.

3. The removable blind fastener of claim 2, wherein the second member slides within the first member.

4. The removable blind fastener of claim 3, wherein the inside surface of the first member is a non-circular shape and the outside of the second member is a co-operating non circular shape to prevent rotation of the second member inside the first member.

5. The removable blind fastener of claim 1, wherein at least two fingers, such as three or four fingers are provided.

6. The removable blind fastener of claim 5, wherein each finger head provides a planar surface to engage with a planar surface of a work-piece face.

7. The removable blind fastener of claim 6, wherein the heads on the flexible fingers in combination form a cone shape prior to being biased radially outwards.

8. The removable blind fastener of claim 1, wherein the first and second members form a cylindrical body and the heads on the flexible fingers are biased to a position within the circumference of the cylindrical body before being biased outwards by the screw.

9. The removable blind fastener of claim 1, wherein the finger or fingers are biased outwards by the end of the screw shaft remote from the screw head, such that the radial expansion of the or each finger is complete before the or each finger engages the face of the other work-piece.

10. The removable blind fastener of claim 1, wherein the finger engagement surface of the screw shaft is smooth.

11. The removable blind fastener of claim 1, wherein the finger engagement surface of the screw shaft is tapered.

12. The removable blind fastener of claim 1, wherein the screw head is housed in a recess in the first member head.

13. The removable blind fastener of claim 12, wherein the screw head is adapted to receive a tool to turn it.

14. The removable blind fastener of claim 13, wherein the head includes a hex recess to receive a hex tool.

15. The removable blind fastener of claim 1, wherein the first member head is adapted to receive a tool to prevent it from rotating whilst said screw head is rotated.

16. The removable blind fastener of claim 1, wherein the first member head includes slots to receive a tool.

17. The removable blind fastener of claim 1, wherein the outer surface of the first member is polished for sliding engagement with a bore.

18. The removable blind fastener of claim 1, wherein the first member is a dowel to align the work-pieces.

19. The removable blind fastener of claim 1, wherein the first member has a chamfered outer edge to assist with insertion of the fastener into a hole.

20. The removable blind fastener of claim 1, wherein the first member has a countersunk head so that it may fit flush with a surface of the work-pieces.

21. The removable blind fastener of claim 1, wherein the screw member has a countersunk head and the first member has a recess to receive the countersunk head of the screw member, so that the screw member head is a flush fit with the first member.

22. The removable blind fastener of claim 1, wherein the fastener is operable from one side of work-pieces to be joined.

23. A removable blind fastener comprising: a first member having an elongate body with a head at one end, a second member having an elongate body extending from and adapted to slide relative to the first member, said second member having at least one flexible finger with a finger head at one end remote from the first member, a screw member having a screw head adjacent the first member head and a screw shaft which passes through a restriction in the first member, wherein the restriction prevents removal of the second member from the head end of the first member, and wherein the screw member engages with a threaded aperture on the second member, rotation of the screw member in one direction sliding the second member towards the first member and biasing the or each flexible finger radially outward and rotation of the screw member in the other direction sliding the second member away from the first member and allowing the or each flexible finger to move radially inwards, such that in use the fastener comprising a unit of the first member, second member and screw member is insertable and removable through an aperture in work-pieces to be joined, with the head of the first member located against a face of one work-piece, and rotation of said screw causing the or each flexible finger to expand radially outward so the finger head on the or each finger engages a face of another work-piece and causing the work-pieces to be drawn together as said second member slides towards the first member.

24. A method of using a removable blind fastener in an aperture in workpieces to be fastened together, wherein the removable blind fastener comprises a first member having an elongate body with a head at one end, a second member having an elongate body extending from and adapted to slide relative to the first member, said second member having at least one flexible finger with a finger head at one end remote from the first member, and a screw member having a screw head adjacent the first member head, and a screw shaft which passes through a restriction in the head end of the first member, wherein the restriction prevents removal of the second member from the head end of the first member, wherein the screw member engages with a threaded aperture on the second member, said method comprising;

inserting the fastener comprising the first member, the second member and the screw member into an aperture in the workpieces such that the head of the first member is located against a face of one workpiece;

rotating the screw member to bias the at least one flexible finger radially outward;

further rotating the screw member to slide the second member towards the first member such that the finger head or heads of the or each fingers engages a face of the workpiece causing the workpieces to be drawn together; and subsequently     removing the fastener comprising the first member, the second member and the screw member from the aperture in the workpieces by rotating the screw member to slide the second member away from the first member such that the finger head or heads of the or each fingers disengage a face of the workpiece allowing the workpieces to be separated, and     further rotating the screw member to allow the at least one flexible finger to move radially inwards such that the fastener is free to be removed from the aperture in the workpieces.

\* \* \* \* \*